US009595854B2

(12) United States Patent
Klopp et al.

(10) Patent No.: US 9,595,854 B2
(45) Date of Patent: Mar. 14, 2017

(54) ELECTRIC MACHINE, MOISTURE GUIDE AND ASSOCIATED METHOD

(71) Applicant: Regal Beloit America, Inc., Beloit, WI (US)

(72) Inventors: Mark Lyon Klopp, Berne, IN (US); Zachary Joseph Stauffer, Fort Wayne, IN (US); Michael Allen Marks, Fort Wayne, IN (US)

(73) Assignee: Regal Beloit America, Inc., Beloit, WI (US)

( * ) Notice: Subject to any disclaimer, the term of this patent is extended or adjusted under 35 U.S.C. 154(b) by 185 days.

(21) Appl. No.: 14/457,570

(22) Filed: Aug. 12, 2014

(65) Prior Publication Data
US 2016/0049842 A1 Feb. 18, 2016

(51) Int. Cl.
*H02K 5/04* (2006.01)
*H02K 5/22* (2006.01)

(52) U.S. Cl.
CPC ............... *H02K 5/04* (2013.01); *H02K 5/225* (2013.01); *H02K 2205/09* (2013.01)

(58) Field of Classification Search
CPC H02K 5/04; H02K 5/12; H02K 5/132; H02K 5/20; H02K 5/10; H02K 2205/09; H02K 5/225
USPC ............................ 310/89, 70, 66, 88, 71, 87
See application file for complete search history.

(56) References Cited

U.S. PATENT DOCUMENTS

| 2,812,456 | A | | 11/1957 | Lubberhuizen | |
|---|---|---|---|---|---|
| 4,939,397 | A | | 7/1990 | Morrill | |
| 5,049,770 | A | * | 9/1991 | Gaeth | F02B 63/06 310/43 |
| 5,639,393 | A | * | 6/1997 | Veltum | B60S 1/0822 219/209 |
| 5,939,807 | A | * | 8/1999 | Patyk | H02K 5/161 310/64 |
| 6,274,957 | B1 | * | 8/2001 | Mahn | H02K 3/38 29/596 |
| 6,342,771 | B1 | | 1/2002 | Tödteberg | |

(Continued)

FOREIGN PATENT DOCUMENTS

| CN | 1108501 C | 5/2003 |
|---|---|---|
| CN | 2010098214 Y | 8/2008 |

(Continued)

OTHER PUBLICATIONS

Myla rOverview from DuPont Teijin Films Dates Jun. 2003 Mylar is a polymer.*

*Primary Examiner* — Terrance Kenerly
*Assistant Examiner* — Maged Almawri
(74) *Attorney, Agent, or Firm* — John Wagley

(57) ABSTRACT

According to an embodiment of the invention, an electric machine for use in an environment having moisture is provided. The machine includes a housing that has an inner surface defining a cavity in the housing. The housing defines a leak path exit adapted to remove moisture accumulating within the housing away from the housing. The electric machine further includes a stator secured to the housing and a rotor that is rotatably secured to the housing. The electric machine further includes a moisture guide positioned at least partially within the cavity and adapted to guide at least some of the moisture toward the leak path exit.

15 Claims, 7 Drawing Sheets

(56) References Cited

U.S. PATENT DOCUMENTS

| | | | | |
|---|---|---|---|---|
| 6,528,919 B2* | 3/2003 | Fujii | ................... | H02K 5/10 |
| | | | | 310/52 |
| 6,949,849 B1* | 9/2005 | Wright | ................... | H02K 11/33 |
| | | | | 310/64 |
| 7,791,234 B2* | 9/2010 | Nolley | ................... | H02K 5/15 |
| | | | | 310/89 |
| 7,804,212 B2 | 9/2010 | Moody | | |
| 8,853,900 B2* | 10/2014 | Zeng | ................... | H02K 11/33 |
| | | | | 310/68 R |
| 2001/0051098 A1* | 12/2001 | Kenney | ................... | F02M 37/08 |
| | | | | 417/410.1 |
| 2002/0109426 A1* | 8/2002 | Peter | ................... | H02K 1/187 |
| | | | | 310/89 |
| 2011/0068649 A1* | 3/2011 | Chai | ................... | H02K 5/10 |
| | | | | 310/90 |
| 2012/0104907 A1* | 5/2012 | Zeng | ................... | H02K 11/33 |
| | | | | 310/68 R |
| 2015/0017034 A1* | 1/2015 | Jacobsen | ................... | H02K 5/10 |
| | | | | 417/423.14 |
| 2015/0318752 A1* | 11/2015 | Collins | ................... | H02K 5/04 |
| | | | | 310/64 |

FOREIGN PATENT DOCUMENTS

| | | | | | |
|---|---|---|---|---|---|
| CN | | 102412545 | A | 4/2012 | |
| DK | WO | 2013117380 | A1 * | 8/2013 | ............... H02K 5/10 |
| JP | | 2010027877 | A | 2/2010 | |
| KR | | 2014095659 | A | 8/2014 | |
| WO | WO | 2013117380 | A1 * | 8/2013 | ............... H02K 5/10 |

* cited by examiner

ELECTRIC MACHINE, MOISTURE GUIDE AND ASSOCIATED METHOD

BACKGROUND OF THE INVENTION

The embodiments described herein relate generally to an electric machine, and more specifically, to an electric machine with components to shield from fluids.

An electric machine is typically in the form of an electric generator or an electric motor. The machine typically has a centrally located shaft that rotates relative to the machine. Electrical energy applied to coils within the machine initiates this relative motion which transfers the power to the shaft and, alternatively, mechanical energy from the relative motion of the generator excites electrical energy into the coils. For expediency, the machine will be described hereinafter as a motor. It should be appreciated that a machine may operate as a generator and vice versa.

A stationary assembly, also referred to as a stator, includes a stator core and coils or windings positioned around portions of the stator core. It is these coils to which energy is applied to initiate this relative motion which transfers the power to the shaft. These coils are formed by winding wire, typically copper, aluminum or a combination thereof, about a central core to four the winding or coil. An electric current is directed through the coils which induces a magnetic field. It is the magnetic field that initiates this relative motion which transfers the power to the shaft.

The electric machine typically includes a housing for containing and supporting the stator. To position the stator and other components within the housing, typically the housing includes a plurality of components that are separated from each other to permit machine assembly. These components are assembled together and may provide leak paths to the internal workings of the machine when the electric machine is exposed to fluids. Fluids, for example water, may enter into the internal workings of the machine through the leak paths.

The present invention is directed to alleviate at least some of these problems with the prior art.

BRIEF DESCRIPTION OF THE INVENTION

According to an embodiment of the invention, an electric machine for use in an environment having moisture is provided. The machine includes a housing that has an inner surface defining a cavity in the housing. The housing defines a leak path exit adapted to remove moisture accumulating within the housing away from the housing. The electric machine further includes a stator secured to the housing and a rotor that is rotatably secured to the housing. The electric machine further includes a moisture guide positioned at least partially within the cavity and adapted to guide at least some of the moisture toward the leak path exit.

According to an aspect of the present invention, the electric machine may be provided wherein the inner cavity is generally cylindrical and wherein the moisture guide is generally planar.

According to another aspect of the present invention, the electric machine may further include at least one control component. The moisture guide may be positioned at least partially above the control component.

According to another aspect of the present invention, the electric machine may be provided wherein the moisture guide is adapted to divert moisture toward the inner surface of the housing.

According to another aspect of the present invention, the electric machine may be provided wherein the moisture guide is spaced from the inner surface of the housing a distance of no more than 2.0 inches.

According to another aspect of the present invention, the electric machine may be provided wherein the moisture guide is made of a polymer.

According to another aspect of the present invention, the electric machine may be provided wherein the rotor defines an axis of rotation thereof and wherein at least a portion of the moisture guide is positioned in an orientation skewed with respect to the axis of rotation of the rotor.

According to another aspect of the present invention and referring to FIG. 5, an electric machine 12 may be provided wherein the rotor 13 (see FIG. 1) defines axis of rotation 28 thereof and wherein a moisture guide 22 includes a first planar portion 30 thereof positioned at a first angle $\alpha\alpha$ with respect to the axis of rotation 28 of the rotor 13. The moisture guide 22 may include a second planar portion 34 thereof extending from the first portion 30 and positioned at a second angle $\beta\beta$ with respect to the axis of rotation 28 of the rotor 13. The moisture guide 22 may further include a third planar portion 32 thereof extending from the second portion 34 and positioned at a third angle $\alpha\alpha\alpha$ with respect to the axis of rotation 28 of the rotor 13. At least one of the first angle $\alpha\alpha$, the second angle $\beta\beta$ and the third angle $\alpha\alpha\alpha$ may be different from the other of the first angle $\alpha\alpha$, the second angle $\beta\beta$ and the third angle $\alpha\alpha\alpha$.

According to another aspect of the present invention, the electric machine may be provided wherein at least two of the first angle, the second angle and the third angle are different from the other of the first angle, the second angle and the third angle.

According to another aspect of the present invention, the electric machine may be provided wherein the moisture guide defines an aperture therein for at the passage therethrough of at least one of a conduit, an electrical component or a fastener.

According to another aspect of the present invention, the electric machine may be provided wherein the moisture guide includes an electrically conductive material.

According to an embodiment of the invention, a moisture guide for use in a cavity formed by an inner surface of a housing of an electric machine is provided. The housing defines an inner wall defining an opening therethrough. The moisture guide includes a member adapted to guide moisture toward opening.

According to another aspect of the present invention, the moisture guide may be provided wherein the moisture guide is adapted to divert moisture toward the inner surface of the housing.

According to another aspect of the present invention, the moisture guide may be provided wherein the outer periphery of the guide generally cylindrical and wherein at least a portion of the moisture guide is generally planar.

According to another aspect of the present invention, the moisture guide may be provided wherein the moisture guide is sized to be spaced a distance of no more than 2 inches from the inner surface of the housing.

According to another aspect of the present invention, the moisture guide may be provided wherein the moisture guide is adapted to be used in a motor having sensitive components and adapted to provide a desired leak path by occupying a portion of the cavity of the housing sufficient enough to direct moisture away from the sensitive components and toward the opening of the housing.

According to another aspect of the present invention, the moisture guide may be provided wherein the moisture guide is made of a polymer.

According to another aspect of the present invention, the moisture guide may be provided wherein the housing is generally cylindrical and defines a cylindrical axis thereof, wherein the moisture guide includes a first planar portion thereof positioned at a first angle with respect to the cylindrical axis of the housing, and wherein the moisture guide includes a second planar portion thereof extending from the first portion and positioned at a second angle with respect to the cylindrical axis of the housing.

According to another aspect of the present invention, the moisture guide may be provided wherein the moisture guide includes a mylar sheet.

According to an embodiment of the invention, a method for guiding moisture in a cavity of an electric machine is provided. The cavity is defined by an inner surface of a housing of the electric machine. The method includes the steps of providing a moisture guide and adapted to divert moisture toward the inner surface of the housing and positioning the moisture guide in the cavity. The method also includes the steps of accumulating moisture formed in the cavity onto a surface of the moisture guide and urging by gravity the moisture on the surface of the moisture guide toward the inner surface of the housing.

According to an embodiment of the present invention, an electric machine is provided. The electric machine includes a housing. The housing has an inner surface defining a cavity in the housing. The electric machine also includes a stator secured to the housing and a rotor, rotatably secured to the housing. The electric machine also includes a moisture guide positionable in the cavity and adapter to divert moisture toward the inner surface of the housing.

According to an aspect of the present invention, the electric machine may be provided wherein the inner cavity is generally cylindrical and wherein the moisture guide is generally planar.

According to another aspect of the present invention, the electric machine may be provided wherein the moisture guide is spaced a distance of no more than 2 inches from a desired leak path.

According to another aspect of the present invention, the electric machine may be provided wherein the moisture guide is spaced a distance of no more than 1 inch from a desired leak path.

According to another aspect of the present invention, the electric machine may be provided wherein the moisture guide is made of a polymer.

According to another aspect of the present invention, the electric machine may be provided wherein the moisture guide is made of a mylar.

According to another aspect of the present invention, the electric machine may be provided wherein the rotor defines an axis of rotation thereof and wherein at least a portion of the moisture guide is positioned in an orientation skewed with respect to the axis of rotation of the rotor.

According to another aspect of the present invention, the electric machine may be provided wherein the rotor defines an axis of rotation thereof, wherein the moisture guide includes a first planar portion thereof positioned at a first angle with respect to the axis of rotation of the rotor, wherein the moisture guide includes a second planar portion thereof extending from the first portion and positioned at a second angle with respect to the axis of rotation of the rotor, wherein the moisture guide includes a third planar portion thereof extending from the second portion and positioned at a third angle with respect to the axis of rotation of the rotor, and wherein at least one of the first angle, the second angle and the third angle are different from the other of the first angle, the second angle and the third angle.

According to another aspect of the present invention, the electric machine may be provided wherein at least two of the first angle, the second angle and the third angle are different from the other of the first angle, the second angle and the third angle.

According to another aspect of the present invention, the electric machine may be provided wherein the moisture guide defines an aperture therein for at the passage therethrough of at least one of a conduit, an electrical component or a fastener.

According to another aspect of the present invention, the electric machine may be provided wherein the moisture guide includes an electrically conductive material.

According to another embodiment of the present invention, a moisture guide for use in a cavity formed by an inner surface of a housing of an electric machine is provided. The moisture guide including a member adapter to divert moisture toward the inner surface of the housing.

According to another aspect of the present invention, the moisture guide may be provided wherein the cavity of the motor is generally cylindrical and wherein the moisture guide is generally planar.

According to another aspect of the present invention, the the moisture guide may be provided wherein the moisture guide is spaced a distance of no more than 2 inch from a desired leak path.

According to another aspect of the present invention, the the moisture guide may be provided wherein the moisture guide is spaced a distance of no more than 1 inch from a desired leak path.

According to another aspect of the present invention, the moisture guide may be provided wherein the moisture guide is made of a polymer.

According to another aspect of the present invention, the moisture guide may be provided wherein the housing is generally cylindrical and defines a cylindrical axis thereof and wherein at least a portion of the moisture guide is positioned in an orientation skewed with respect to the cylindrical axis of the housing.

According to another aspect of the present invention, the moisture guide may be provided wherein the housing is generally cylindrical and defines a cylindrical axis thereof and wherein the moisture guide includes a first planar portion thereof positioned at a first angle with respect to the cylindrical axis of the housing. The moisture guide may be further provided wherein the moisture guide includes a second planar portion thereof extending from the first portion and positioned at a second angle with respect to the cylindrical axis of the housing, wherein the moisture guide includes a third planar portion thereof extending from the second portion and positioned at a third angle with respect to the cylindrical axis of the housing, and wherein at least one of the first angle, the second angle and the third angle are different from the other of the first angle, the second angle and the third angle.

According to another aspect of the present invention, the moisture guide may be provided wherein at least two of the first angle, the second angle and the third angle are different from the other of the first angle, the second angle and the third angle.

According to another aspect of the present invention, the moisture guide may be provided wherein the moisture guide defines an aperture therein for at the passage therethrough of at least one of a conduit, an electrical component or a fastener.

According to another aspect of the present invention, the moisture guide may be provided wherein the moisture guide includes a mylar sheet.

According to another embodiment of the present invention, a method for guiding moisture in a cavity of an electric machine is provided. The cavity is defined by an inner surface of a housing of the electric machine. The method includes the steps of providing a moisture guide and adapted to divert moisture toward the inner surface of the housing, positioning the moisture guide in the cavity, accumulating moisture formed in the cavity onto a surface of the moisture guide, and urging by gravity the moisture on the surface of the moisture guide toward the inner surface of the housing.

DETAILED DESCRIPTION OF THE INVENTION

The electric machine typically includes a housing for containing and supporting a stator which is excited by an electrical source that excites an electromagnetic field in coils in the stator. The coils interact with a rotor rotatably supported in the housing to provide the mechanical rotational energy for the electrical machine. To position the stator and other components within the housing, typically the housing includes a plurality of components that are separated from each other to permit machine assembly and later joined together to provide the electric machine. The connecting points of these components, once assembled together, may provide leak paths to the internal workings of the machine when the electric machine is exposed to an environment including fluids. Fluids, for example water, may enter into the internal workings of the machine through the leak paths. Some of the internal working, for example electronic components, are particularly sensitive to fluids such as water.

Attempts to seal these leak paths may not be effective and may be very expensive. Inexpensive and reliable managing of moisture entering the housing of an electric machine is desirable in the design and manufacture of such electric machines. The method, systems and apparatus described herein facilitate inexpensive and reliable managing of moisture entering the housing of an electric machine. Designs and methods are provided herein to facilitate inexpensive and reliable managing of moisture entering the housing of an electric machine.

Technical effects of the methods, systems, and apparatus described herein include at least one of reduced cost, improved serviceability, improved performance and quality and reduced labor costs.

Figure 1:
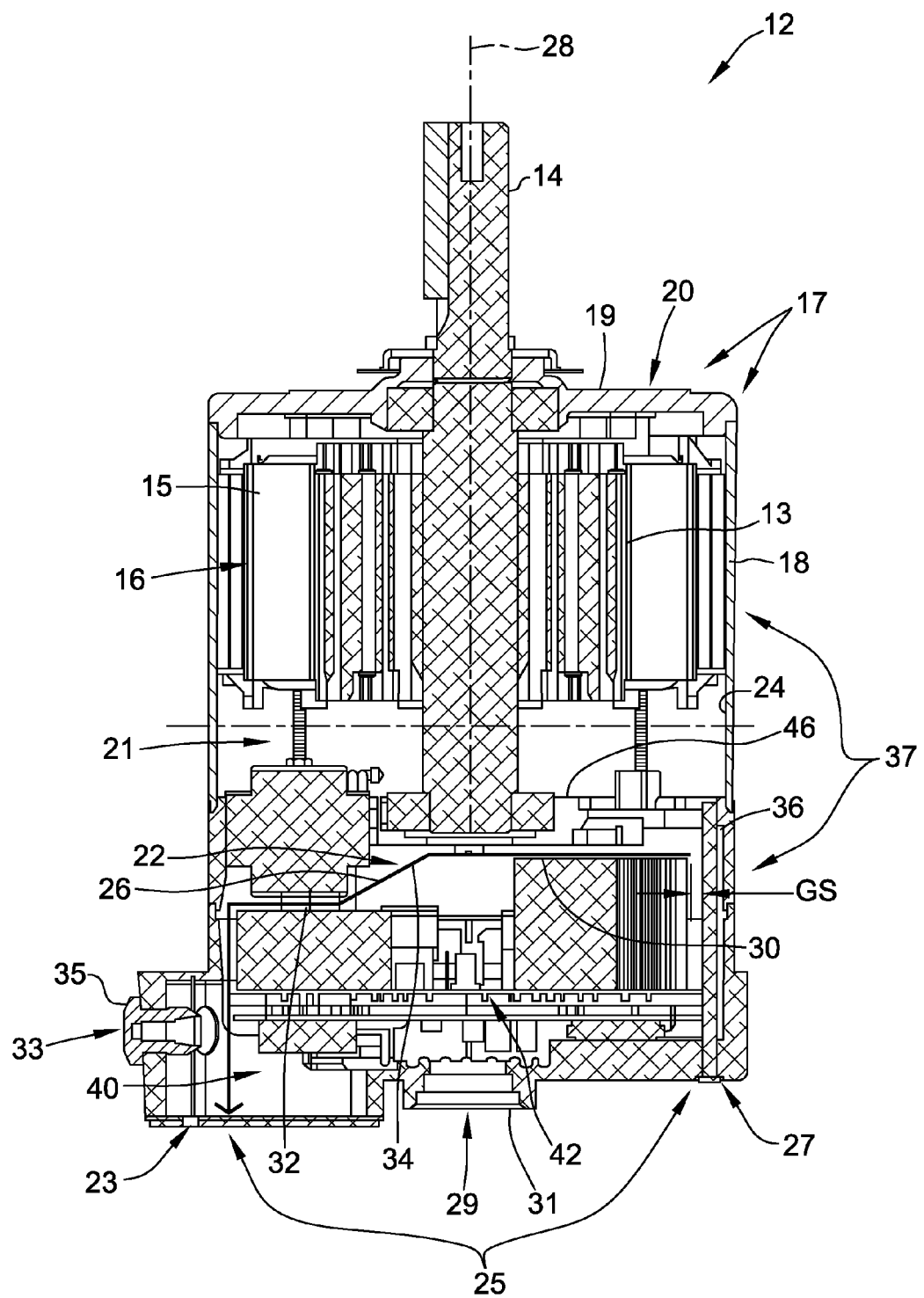
FIG. 1 is a cross-sectional plan view of an embodiment of the present invention in the form of an electric machine.

According to an embodiment of the present invention and referring to FIG. 1, an electric machine 12 is provided. The electric machine 12 may be used in environments where moisture exists. The electric machine 12 may be an electric motor or an electric generator, but hereinafter will be described as an electric motor 12. It should be appreciated that the electric motor may be used to power any mechanism, for example, a pump, a cyclic drive, a compressor, a vehicle, a fan or a blower.

The electric motor 12 typically includes a centrally located motor shaft 14 that rotates relative to the motor 12. Electrical energy applied to coils 15 within the motor 12. The coils generate an electromagnetic field that cooperates with an electromagnetic field in rotor 13 mounted to the motor shaft 14. The coils 15 initiate relative motion between the shaft 14 and the motor 12 that transfers the power from the coils to the shaft 14.

A stationary assembly 16, also referred to as a stator, includes the stator core and coils 15 or windings positioned around portions of the stator core. It is these coils to which energy is applied to initiate this relative motion which transfers the power to the shaft. These coils 15 are formed by winding wire (not shown), typically copper, aluminum or a combination thereof, about a central core to form the winding or coil. An electric current is directed through the coils 15 which induces a magnetic field. It is the magnetic field that initiates this relative motion which transfers the power to the shaft 14.

Typically the motor 12 includes a housing 17 having an inner wall or surface 24 that defines a motor cavity 21 therein. The housing 17 may include a plurality of components and may be made of a suitable durable material, for example a metal, a polymer or a composite. The housing 17 may, as shown, include a cylindrical shell 18 and opposed end caps 20. The shaft 14 extends outwardly from an end 19 of the electric motor 12, typically from one of the end caps 20. The motor 12 may have any suitable size and shape and may be, for example, an induction motor, a permanent-split capacitor (PSC) motor, an electronically commutated motor (ECM) motor, or a switched reluctance motor. The housing 17 may include protrusions, for example fins (not shown), for dissipation of heat. The motor 12 may also include a fan (not shown) positioned within housing 17.

It should be appreciated that the housing of the motor may have any suitable shape. One common shape of a motor housing is that of a cylindrical solid, having a generally cylindrical cross section. The shaft on a motor with such a shape generally extends from an end of the motor.

The motor 12 may be oriented in any direction, when in use. Typical orientations include a horizontal orientation or mount in which the shaft is parallel to the ground and a vertical orientation or mount in which the shaft is perpendicular to the ground.

Fluids, particularly water and humidity within a motor are generally undesirable as they may lead to corrosion of motor components, shorting of electrical paths and damage to electrical and electronic components within the motor. Many motors are, therefore, designed to inhibit moisture from entering the motor. However attempts to design motors that inhibit moisture from entering the motor are either not completely effective and/or very expensive. Further, even if fluids are generally prevented from entering the motor, moisture can form within the motor during external environmental temperature and humidity changes as well as due to temperature and humidity changes due to the duty cycle of the motor. The moisture formed migrates by gravity to the lowest part of the motor.

According to an embodiment of the present invention, the electric machine 12 also includes a moisture guide 22 positioned at least partially in the cavity 21. The guide 22 is adapted to guide at least some of the moisture within the machine 12 toward a leak path exit, aperture or opening 25. The leak path exit 25 provides a path for moisture to leave or exit the motor cavity 21 that is defined by the inner wall or surface 24 of housing 17. The leak path exit 25 may, for example, be a vent hole 23, a bolt hole 27, a control vent hole cup center or opening 29 for receiving control cup 31 or central shaft opening (not shown), or a control conduit opening 33 for control conduit cover 35. The leak path exit 25 is preferably below internal components 37. The internal components 37 may include, for example, rotor 13, coils 15 and stator 16.

As shown in FIG. 1, the guide 22 may be adapted to utilize gravity to guide or divert moisture away from internal components 37 that are more sensitive to fluids or moisture toward inner surface 24 of the housing 17 and may be guided out of the cavity 21 through vent hole 23 in the housing 17.

The moisture guide 22 may have any shape and may be used to protect the portion of the cavity 21 below the guide 22 from moisture above. Thus, the guide 22 may be generally positioned in a horizontal orientation. The guide 22 may be designed to direct by gravity moisture collected on top surface 26 of guide 22 toward inner surface 24 of the housing 17. It should be appreciated that to span the motor cavity 22 for a horizontal motor mounting configuration, the guide has a generally rectangular shape. Further, it should be appreciated that to span the motor cavity for a vertical motor mounting configuration, the guide 22 of FIG. 1 has a generally circular shape.

While the moisture guide 22 is adapted to guide moisture to the vent hole 23, it should be appreciated a moisture guide according to the present invention may direct the moisture to one or several of the leak path exits 25 in any of a number of desired leak paths. A desired leak path would preferably guide moisture away from internal components 37, particularly electrical and electronic components 42. When the desired leak path directs moisture toward one of the leak path exits 25 that is not near the shell 18, as the vent hole 23 is, such as control cup opening 33, the desired leak path may be or include a path near the shell. For example, for a desired leak path that guides moisture toward the control cup opening 33, the desired leak path may be centrally located along rotational centerline 28 of the motor 10. Consequently, for this central desired leak path, the moisture guide may be funnel shaped with a central opening to guide the moisture toward the centrally located control cup opening 33.

While the moisture guide may be helpful for motors with horizontal motor mounts, the moisture guide is particularly well suited for use in vertical motor mounts. In particular, the moisture guide is particularly well suited for use in vertical motor mounts with the shaft oriented upwardly. One such vertical motor mount with the shaft oriented upwardly is the cooling fan motor for exterior residential Heating, Ventilation, and Air Conditioning (HVAC) compressor units.

In vertical motor mounts with the shaft oriented upwardly as is shown with the motor 12 of FIG. 1, the electrical and electronic components that are more sensitive to fluids or moisture are positioned at the bottom of the cavity 21.

The moisture guide 22 may, as shown, be adapted for a vertically mounted motor. The guide 22 may, for simplicity, be generally planar. The guide may be made of any suitable, durable material. The guide 22 may be made of an electrically conductive material and/or an electrically nonconductive material. The guide 22 may be made of a single shell of material, for example a polymer, for example a mylar sheet. The polymer may be an electrically nonconductive material. The material may be an electrically conductive material, for example a metal. The guide 22 may be in a single plane and may be perpendicular to rotational centerline 28 of shaft 14. Since the guide 22 directs moisture from its top surface 26 toward inner surface 24 of the housing 17, the guide 22 may be convex with the convex surface located upwardly. Alternatively, the guide may be conical with the apex pointed upwardly.

Alternatively and as shown in FIG. 1, the guide may be bent or folded from a planar sheet. For example and as shown, the guide may form an upper horizontal portion 30 and a lower horizontal portion 32, joined by an inclined connecting portion 34. Horizontal portions may be more easily designed to provide a compact motor design. Alternatively, the guide 22 may be skewed with respect to rotational centerline 28 of shaft 14. The skewing of the guide 22 may be provided to align the lower portion of the guide with the vent hole 23 in the housing 17.

As shown in FIG. 1, gravity urges the moisture collected on top surface 26 of upper horizontal portion 30, toward top surface 26 of inclined connecting portion and then to top surface 26 of the lower horizontal portion 30 of guide 22. Gravity then urges the moisture collected on top surface 26 of the lower horizontal portion 30 of guide 22 toward inner surface 24 of the housing 17 and then toward the vent hole 23 in the housing 17, preferably positioned directly below the lower horizontal portion 30 of guide 22. To permit the moisture collected on top surface 26 of guide 22 to fall by gravity from the inner surface 24 of the housing 17, the guide 22 has an outer periphery 36 that is spaced from the inner surface 24 of the housing 17 a distance GS. The distance GS may be constant around guide 22 or may vary around the outer periphery 36. The distance GS may be greater at the lower horizontal portion 32, and in particular greater above the vent hole 23. Alternately the distance GS may be greater than zero only in the lower horizontal portion 32 and the distance GS may be greater than zero only directly above the vent hole 23. The distance GS is selected to permit the moisture droplets to pass between the guide 22 and the housing 17. For example, the distance GS may be 2.0 inches or less. For example, the distance GS may be from about 1 inch to about 0.2 inches. For example, the distance GS may be from about 1 inch to about 0.75 inches. For example, the distance GS may be 0.25 inches or less.

As shown in FIG. 1, the motor 12 may include a lower moisture collection area or reservoir 40 positioned above vent hole 23. Moisture guided by guide 22 collects in reservoir 40 prior to being released through vent hole 23.

As shown in FIG. 1, some of the internal components 37, for example electrical and electronic components 42, for example, integrated circuits, capacitors, resistors, diodes, chokes, etc. may be positioned below guide 22 and thus protected from the moisture and its harmful effects. The guide 22 is particularly useful for electric motors that have electrical and electronic components, such as electrically commutated motors (ECM).

Figure 2:
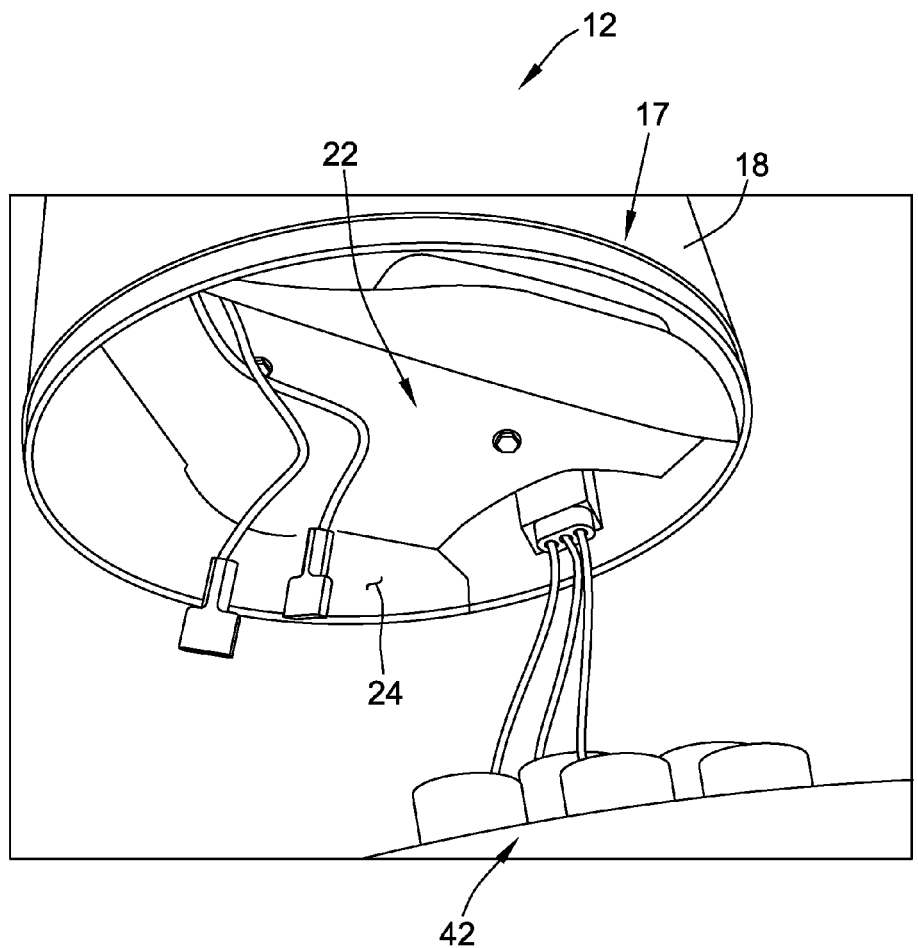
FIG. 2 is a partial perspective view of a moisture guide according to an embodiment of the present invention installed in the electric machine of FIG. 1.

Referring to FIG. 2, the cavity 21 of the motor 12, below the guide 22 is shown. The electrical and electronic components 42 are shown positioned below guide 22 and thus protected from the moisture and its harmful effects.

Figure 3:
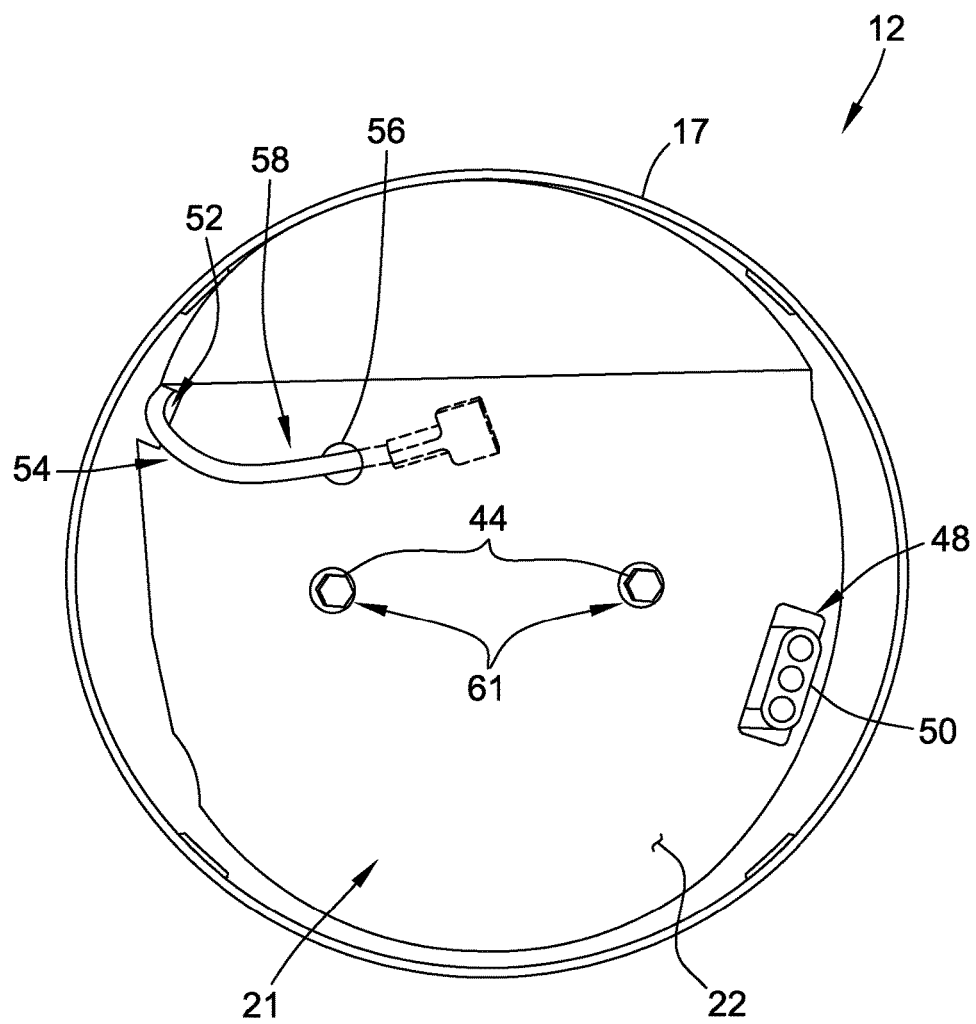
FIG. 3 is a bottom view of the electric machine of FIG. 1 showing the moisture guide of FIG. 2.

Referring now to FIG. 3, the cavity 21 of the motor 12, below the guide 22 is again shown. As can be seen in FIG. 3, the guide 22 may be supported by fasteners 44 in the form of, for example, screws. The screws 44 may be supported by the motor 12. For example, the screws 44 may be connected to mid shield 46 (see FIG. 1). It should be appreciated that a solitary or additional screws may be used.

As shown in FIG. 3, the guide 22 may include pathways for conduits, electrical components and/or fasteners. For example and as shown, the guide 22 may include a connector opening 48 for passageway of connector 50. Also, for example and as shown, the guide 22 may further include notches 52 for passageway of components 54, for example wires or fasteners. Also, for example and as shown, the guide 22 may further include an opening 56 for passageway of terminal 58 and openings 61 for passage of the screws 44.

Figure 4:
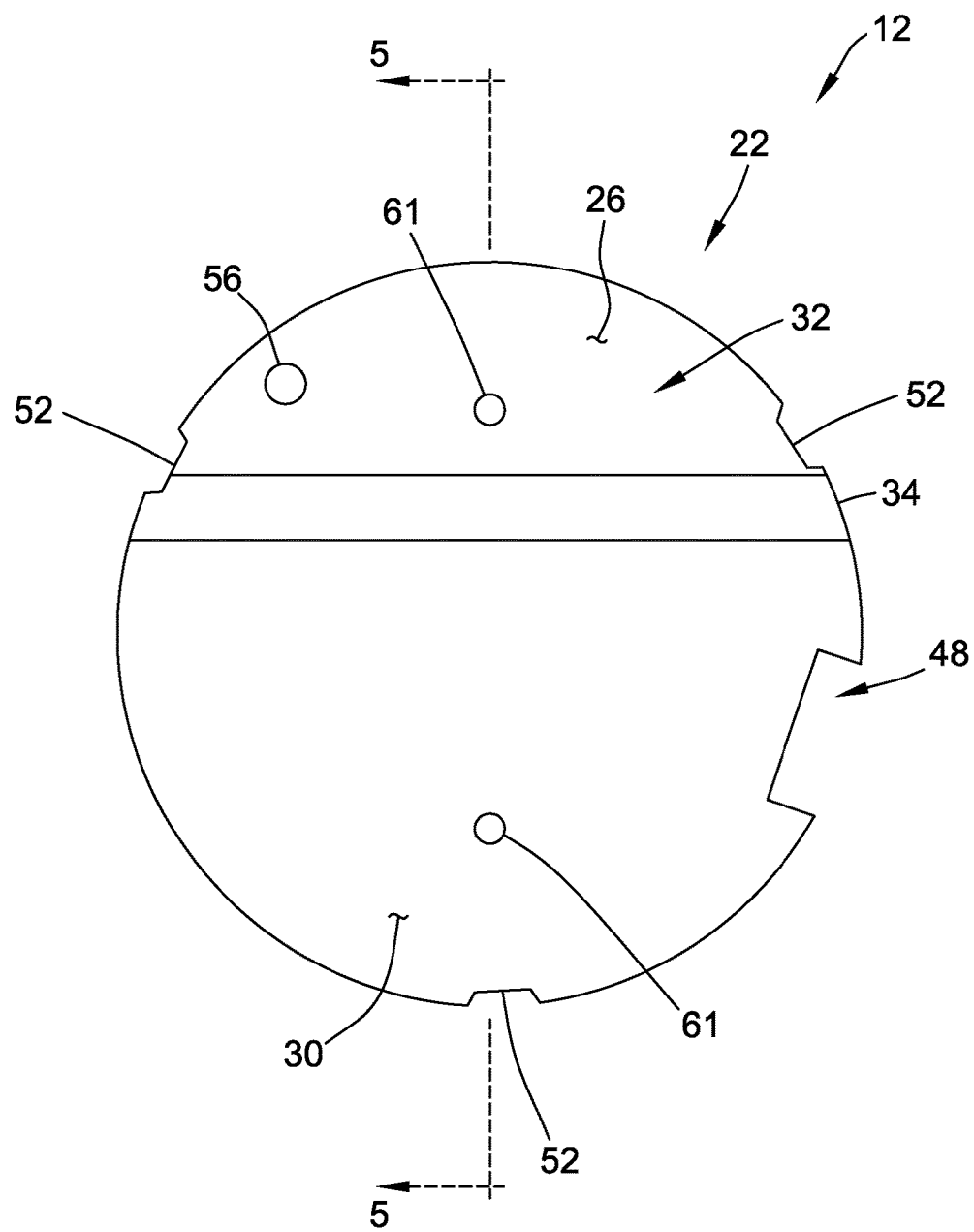
FIG. 4 is a plan view of the moisture guide of FIG. 2.
Figure 5:
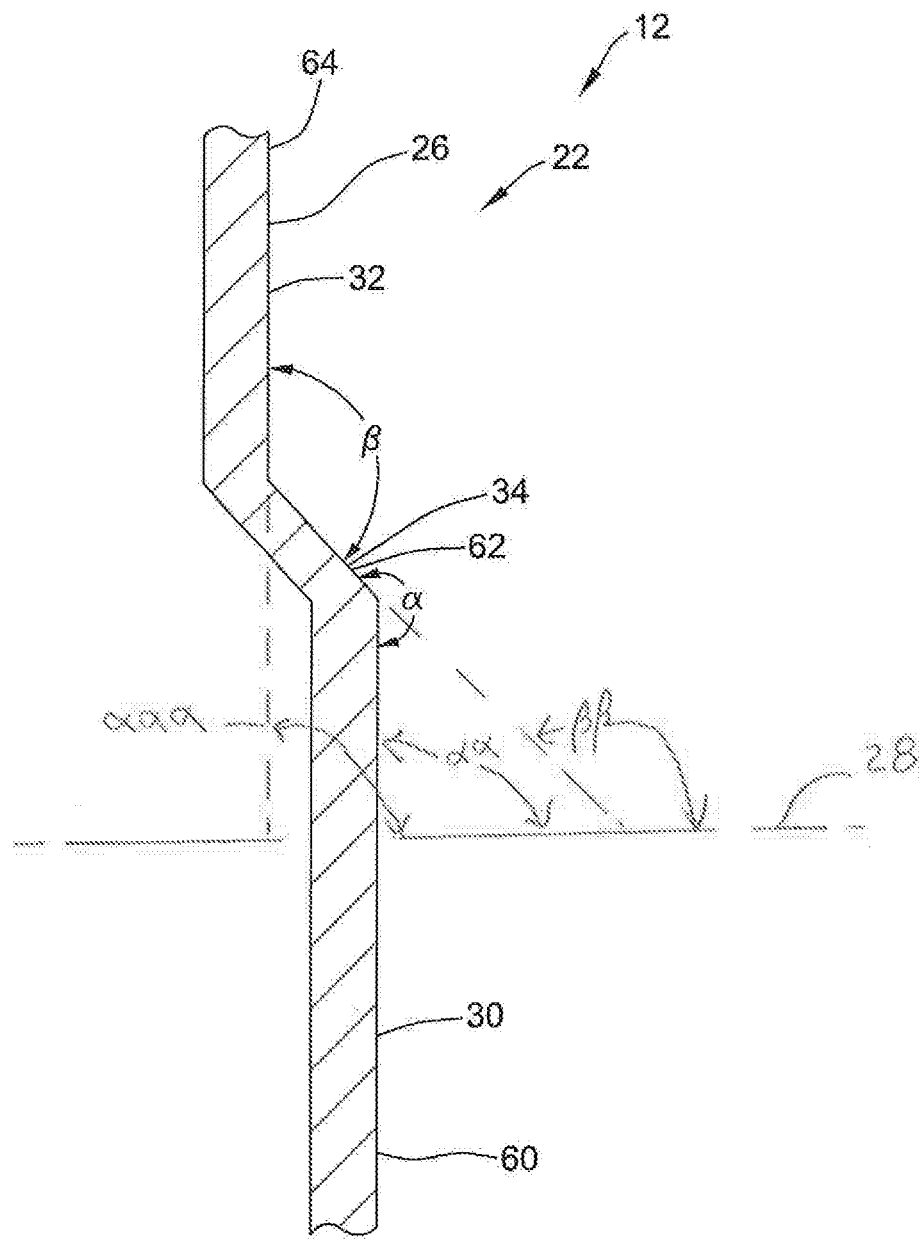
FIG. 5 is a partial cross sectional view of FIG. 4 along the lines 5-5 in the direction of the arrows.

Referring now to FIGS. 4-5, the guide 22 is shown in greater detail. The guide 22 includes the upper horizontal portion 30, the lower horizontal portion 32, joined by the inclined connecting portion 34.

As shown in FIG. 5, upper surface 60 of the upper horizontal portion 30 and upper surface 62 of the inclined connecting portion 34 form angle α therebetween. As shown, the upper surface 62 of the inclined connecting portion 34 and upper surface 64 of the lower horizontal portion 32 form angle β therebetween. The angles α and β may be selected to combine for around 180 degrees so that the upper surface 60 of the upper horizontal portion 30 and the upper surface 64 of the lower horizontal portion 32 are parallel.

The selection of a non planar moisture guide, including the selection of horizontal portions 30 and 32, is made to optimize the guide for a particular motor design and is done to optimize design factors for that motor design, including saving space within the motor 10, providing a simple moisture guide 22, and effectively guiding the moisture toward the leak path exit. It should be appreciated that additional portions including the entire moisture guide may be angled with respect to an horizontal orientation and that that additional portions including the entire moisture guide may be planar or arcuate. It should be appreciated that the greater the angling of the moisture guide with respect to a horizontal orientation the better the movement of the moisture downwardly by gravity toward the leak path exit.

Figure 6:
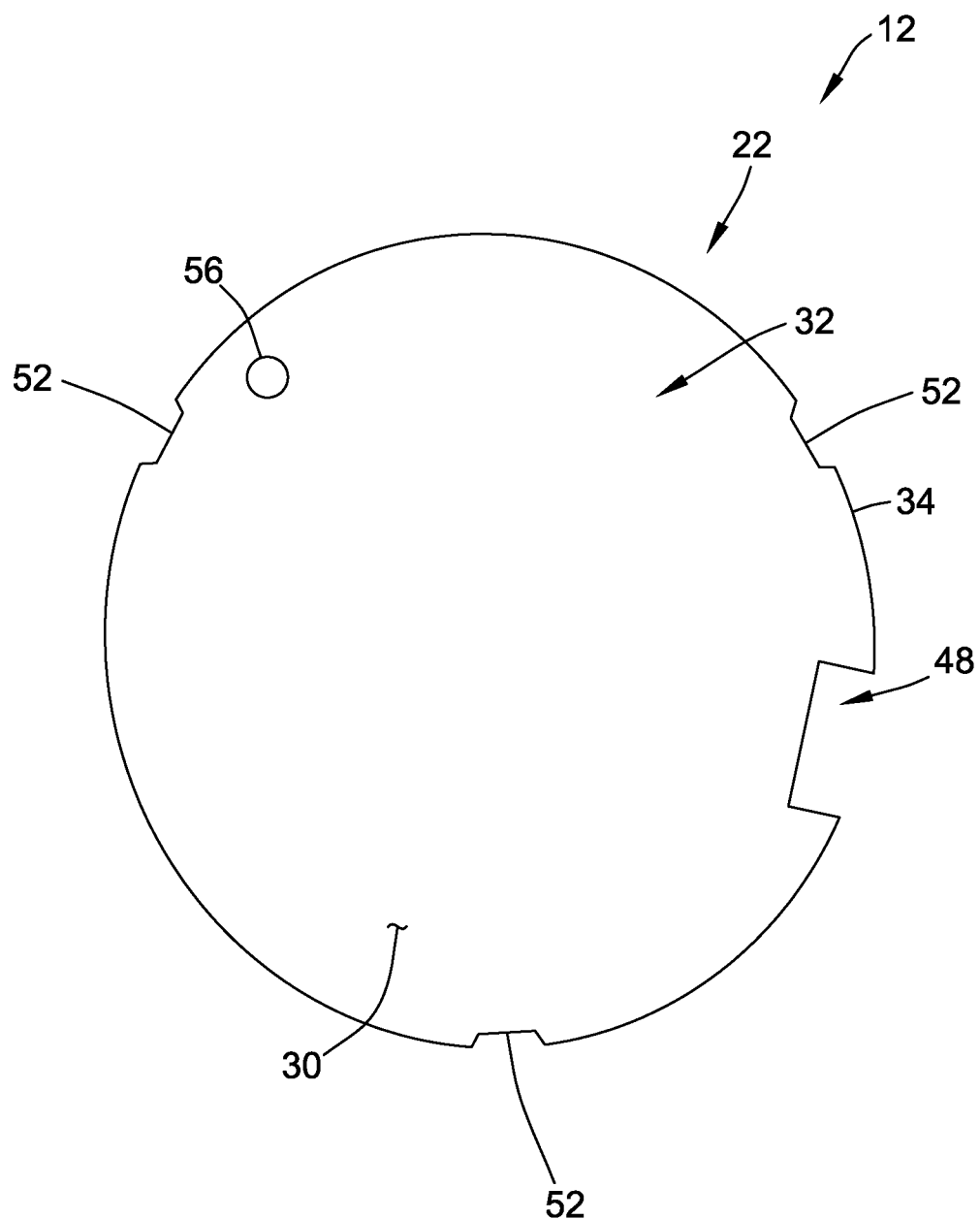
FIG. 6 is a plan view of the moisture guide of FIG. 2 prior to being formed into its operational configuration.

Referring now to FIG. 6, the guide 22 is shown as a single sheet, prior to being folded or formed into three separate planar portions. It should be appreciated that the guide may be made of a single sheet that is not folded, folded into two planar portions or bent into an arcuate shape or into combination of arcuate and planar portions.

Figure 7:
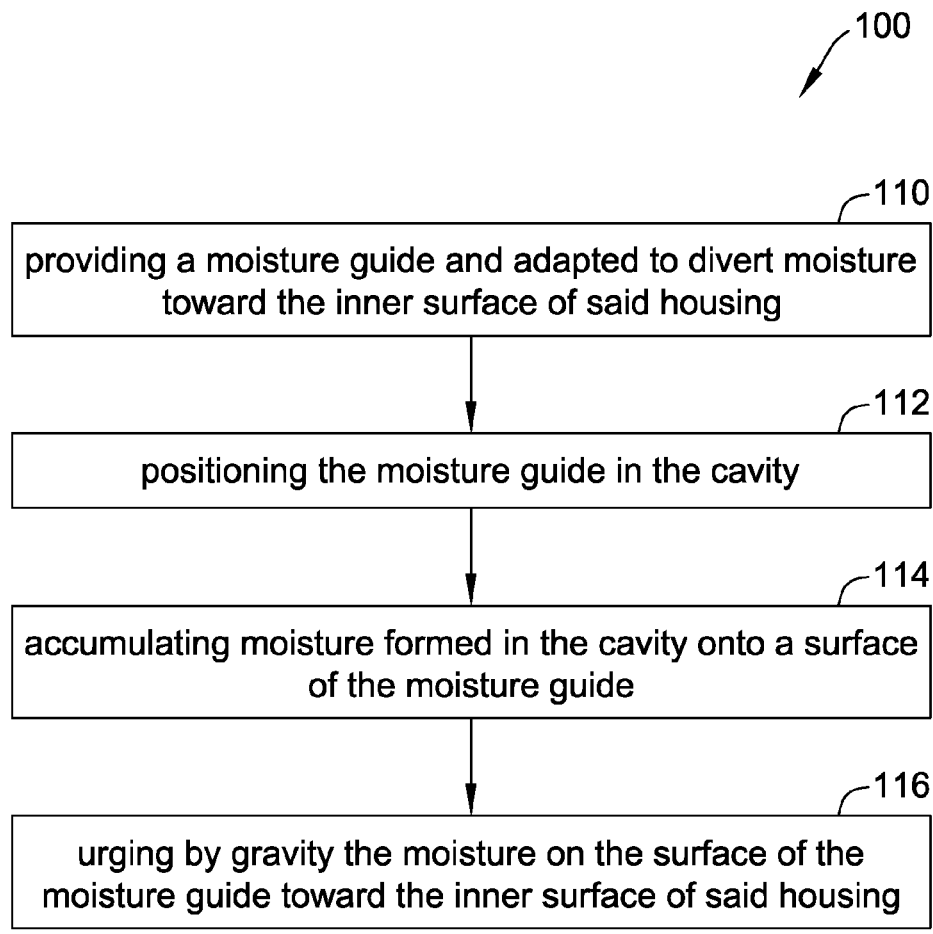
FIG. 7 is a flow chart of another embodiment of the present invention in the form of a method for providing an electric machine.

Referring now to FIG. 7, another embodiment of the present invention is shown as method 100 for guiding moisture in a cavity of an electric machine is provided. The cavity is defined by an inner surface of a housing of the electric machine. The method includes the step 110 of providing a moisture guide adapted to divert moisture toward the inner surface of the housing and the step 112 of positioning the moisture guide in the cavity. The method also includes the step 114 of accumulating moisture formed in the cavity onto a surface of the moisture guide and the step 116 of urging by gravity the moisture on the surface of the moisture guide toward the inner surface of the housing.

The methods, systems, and apparatus described herein facilitate efficient and economical assembly of an electric machine. Exemplary embodiments of methods, systems, and apparatus are described and/or illustrated herein in detail. The methods, systems, and apparatus are not limited to the specific embodiments described herein, but rather, components of each apparatus and system, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "the" are intended to mean that there are one or more, of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Described herein are exemplary methods, systems and apparatus utilizing lower cost materials in a permanent magnet machine that reduces or eliminates the efficiency loss caused by the lower cost material. Furthermore, the exemplary methods system and apparatus achieve increased efficiency while reducing or eliminating an increase of the length of the machine. The methods, system and apparatus described herein may be used in any suitable application. However, they are particularly suited for HVAC and pump applications.

Exemplary embodiments of the fluid flow device and system are described above in detail. The electric machine and its components are not limited to the specific embodiments described herein, but rather, components of the systems may be utilized independently and separately from other components described herein. For example, the components may also be used in combination with other machine systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electric machine for use in an environment having moisture, said machine comprising:
   a housing, said housing having an inner surface defining a cavity therein, the cavity defining a first cavity portion and a second cavity portion adjacent the first cavity portion;
   a stator secured to said housing, said stator positioned at least partially in the first cavity portion and spaced from the second cavity portion;
   a rotor, rotatably secured to said housing, said rotor positioned at least partially in the first cavity portion and spaced from the second cavity portion; said rotor defining a vertical axis of rotation thereof;
   a plurality of electrical components positioned in the second cavity portion; and said housing defines a leak path exit adapted to remove moisture accumulating within said housing from said housing; and
   wherein a moisture guide is adapted to guide at least some of the moisture toward the leak path exit;
   said moisture guide is adapted to divert moisture toward the inner surface of said housing;
   Said moisture guide positioned within the cavity between the first cavity portion and the second cavity portion, said moisture guide including a body having opposed first and second external surfaces extending generally radially from the axis of rotation of said rotor and an edge connecting the surfaces,
   wherein said edge of said moisture guide is spaced radially from the inner surface of said housing a distance of 2 inches or less.

2. The machine as in claim 1: wherein said rotor defines an axis of rotation, the axis of rotation extending in a vertical direction; and
   wherein said plurality of electrical components are positioned below said rotor and said stator.

3. The machine as in claim 1, wherein the entire outer peripheral edge of said moisture guide is spaced from the inner surface of said housing a distance of about 1.0 inches to 0.2 inches.

4. The machine as in claim 1:
   wherein said rotor defines an axis of rotation thereof; and
   wherein at least a portion of said moisture guide is positioned in an orientation skewed with respect to the axis of rotation of said rotor.

5. The machine as in claim 1, wherein said moisture guide defines an aperture therein for at the passage therethrough of at least one of a conduit, an electrical component or a fastener.

6. The machine as in claim 1, wherein said moisture guide comprises an electrically conductive material.

7. The machine as in claim 1:
   wherein said rotor defines an axis of rotation thereof;
   wherein said moisture guide includes a first planar portion thereof positioned at a first angle with respect to the axis of rotation of said rotor;
   wherein said moisture guide includes a second planar portion thereof extending from the first portion and positioned at a second angle with respect to the axis of rotation of said rotor;
   wherein said moisture guide includes a third planar portion thereof extending from the second portion and positioned at a third angle with respect to the axis of rotation of said rotor; and
   wherein at least one of the first angle, the second angle and the third angle are different from the other of the first angle, the second angle and the third angle.

8. The machine as in claim 7, wherein at least two of the first angle, the second angle and the third angle are different from the other of the first angle, the second angle and the third angle.

9. A moisture guide adapted to be removably insertable into a cavity formed by an inner surface of a housing of an electric machine, the cavity defining a first cavity portion and a second cavity portion adjacent the first cavity portion, said electric machine having a rotor rotatably mounted to a stator secured to said housing; said stator positioned at least partially in the first cavity portion and spaced from the second cavity portion; said rotor, rotatably secured to said housing, said rotor positioned at least partially in the first cavity portion and spaced from the second cavity portion; said rotor defining a vertical axis of rotation thereof; and having electrical components positioned in the second cavity portion in the housing and adapted to assist in controlling the electric machine, said housing defining an inner wall defining an opening therethrough, said moisture guide comprising a member adapted to be positioned in the cavity to separate the electrical components from the rotor and the stator and adapted_to guide moisture toward the opening; said housing defines a leak path exit adapted to remove moisture accumulating within said housing from said housing; and wherein said moisture guide is adapted to guide at least some of the moisture toward the leak path exit; said moisture guide is adapted to divert moisture toward the inner surface of said housing; said moisture guide positioned within the cavity between the first cavity portion and the second cavity portion, said guide including a body having opposed first and second external surfaces extending generally radially from the axis of rotation of said rotor and an edge connecting the surfaces, wherein said edge of said moisture guide is spaced radially from the inner surface of said housing a distance of 2 inches or less.

10. The moisture guide as in claim 9:
    wherein the outer periphery of the moisture guide is generally cylindrical; and
    wherein at least a portion of said moisture guide is generally planar.

11. The moisture guide as in claim 9, wherein said moisture guide is adapted to be used in a motor having sensitive components and adapted to provide a desired leak path by occupying a portion of the cavity of the housing sufficient enough to direct moisture away from the sensitive components and toward the opening of the housing.

12. The moisture guide as in claim 9, wherein the entire outer peripheral edge of said moisture guide is spaced from the inner surface of said housing a distance of about 1.0 inches to 0.2 inches.

13. The moisture guide as in claim 9:
    wherein the housing is generally cylindrical and defines a cylindrical axis thereof;
    wherein said moisture guide includes a first planar portion thereof positioned at a first angle with respect to the cylindrical axis of the housing;
    wherein said moisture guide includes a second planar portion thereof extending from the first portion and positioned at a second angle with respect to the cylindrical axis of the housing.

14. The moisture guide as in claim 9, wherein said moisture guide comprises a mylar sheet.

15. A method for guiding moisture in a cavity of an electric machine_having a stator, a rotor having a shaft on an end thereof and a plurality of electrical components, the cavity defined by an inner surface of a housing of the electric machine, the method comprising the steps of: positioning the stator and the rotor in an upper portion of the cavity with the longitudinal axis of the rotor oriented in a vertical direction with the shaft pointing upward positioning the plurality of electrical components in a lower portion of the cavity; providing a housing defining a leak path exit adapted to remove moisture accumulating within said housing from said housing; and Providing a moisture guide adapted to guide at least some of the moisture toward the leak path exit, said moisture guide adapted to divert moisture toward the inner surface of said housing; positioning the moisture guide in the cavity, between the plurality of electrical components in the lower portion of the cavity and the stator and rotor in the upper portion of the cavity; Said moisture guide including a body having opposed first and second external surfaces extending generally radially from the axis of rotation of said rotor and an edge connecting the surfaces, wherein said edge of said moisture guide is spaced radially from the inner surface of said housing a distance of 2 inches or less; Accumulating moisture formed in the cavity onto a surface of said moisture guide; and urging by gravity said moisture on the surface of said moisture guide toward the inner surface of said housing_and downwardly by gravity past said plurality of electrical components.

\* \* \* \* \*